United States Patent

[11] 3,627,609

| [72] | Inventor | Robert A. Bragole<br>Peabody, Mass. |
|------|----------|-------------------------------------|
| [21] | Appl. No. | 801,833 |
| [22] | Filed | Feb. 24, 1969 |
| [45] | Patented | Dec. 14, 1971 |
| [73] | Assignee | USM Corporation<br>Flemington, N.J. |

[54] ADHESIVE PROCESSES
9 Claims, No Drawings

[52] U.S. Cl. ................................................ 156/272,
117/93.3, 204/159.11, 156/333, 156/335, 156/338
[51] Int. Cl. ................................................ B01j 1/10
[50] Field of Search ........................................... 117/93.3,
138.8, 161, 163; 156/327, 335, 272, 326, 333,
338; 250/49.5; 204/159.11

[56] References Cited
UNITED STATES PATENTS

| 2,715,075 | 8/1955 | Wolinski ...................... | 156/272 X |
| 2,715,077 | 8/1955 | Wolinski ...................... | 156/272 X |
| 2,943,664 | 7/1960 | Baldwin et al. ................ | 117/161 X |
| 3,085,076 | 4/1963 | Zimmerman .................. | 156/327 X |
| 3,134,684 | 5/1964 | Northrop et al. .............. | 156/272 UN |
| 3,250,642 | 5/1966 | Parasacco et al. ............. | 156/272 X |

FOREIGN PATENTS

| 1,135,975 | 5/1957 | France ......................... | 156/272 |
| 760,611 | 11/1956 | Great Britain ................ | 156/272 |

*Primary Examiner*—Carl D. Quarforth
*Assistant Examiner*—E. E. Lehmann
*Attorneys*—W. Bigelow Hall, Richard A. Wise and Benjamin C. Pollard

ABSTRACT: Surfaces of substrates which are difficult to bond strongly, e.g. polyethylene, are subjected to ultraviolet radiation in the presence of a photosensitizer and bonded with an adhesive comprising an elastomer and a reactive aldehyde resin to form a structurally strong joint.

ADHESIVE PROCESSES

FIELD OF THE INVENTION

This invention relates to an adhesive process for forming strong bonds to difficultly bondable surfaces.

BACKGROUND OF THE INVENTION

Polyalkylene plastic materials, particularly polyethylene and polypropylene possess many desirable characteristics including inertness to most chemicals and solvents at ordinary temperatures, resistance to electricity, toughness and flexibility. By reason of these and other properties it has been desired to employ such materials in numerous relationships where the bonding of the material to itself or to other surfaces is required.

These materials present a waxy, sometimes paraffinlike surface character, i.e. have a low-critical surface tension of wetting, which interferes with adhesion by the commonly employed adhesive or coating agents. In many relationships, for example, in the use of flexible polyethylene sheet material or the lamination of polyethylene to flexible sheet materials, hot melt adhesives which operate to fuse and integrate with the polyethylene surface may be used to bond the surface. However, there are many other relationships where because of the rigidity of the materials to be combined or because of special contours or other factors, such hot melt adhesive systems are not usable.

Surface pretreatments such as flaming and electrical oxidation are known that will improve the wettability of polyethylene or polyropylene surfaces so that printing inks and pressure-sensitive adhesives will stick to such surfaces.

However, wetting of the polyethylene or polypropylene surfaces is not sufficient for the formation of strong structural adhesive bonds. In particular, it appears that such pretreatments leave a weak boundary layer incapable of withstanding high or continued stresses.

SUMMARY OF THE INVENTION

It is an object of the present invention to provide a process for forming strong adhesive joints to low-energy, e.g. polyethylene or polypropylene surfaces by procedures not involving fusion of such surfaces.

To this end and in accordance with a feature of the present invention a body of a low-surface tension of wetting polymer resin material is subjected to ultraviolet radiation in the presence of a photosensitizer and is bonded with an adhesive comprising an elastomer and a reactive aldehyde-type resin to form a structurally strong joint.

PREFERRED EMBODIMENTS

Materials which are treated according to the process of the present invention are low-surface tension of wetting substrates which because of this characteristic are difficult to wet and bond with adhesives. Materials considered as having low-surface energy are those of which the critical surface tension of wetting is 35 dynes per centimeter or less as determined by contact angle measurements. (See page 20 of "Contact Angle, Wettability and Adhesives," No. 43 of the "Advances in Chemistry Series," published 1964 by the American Chemical Society.) Included in the category are polyethylene, polypropylene, copolymers of ethylene and propylene alone or with a very low percentage of a nonconjugated diene, e.g. the commercial terpolymer EPDM comprising about 64 percent ethylene, about 34 percent propylene and about 2 percent 1,4 hexadiene, and fluorine-containing polymers such as polyvinyl fluoride and polyvinylidene fluoride. Polymers for treatment by the present process must have at least some hydrogen on a carbon chain in a repeating unit in the polymer chain.

The first step in the process is the treatment of the surface of the material by ultraviolet radiation. The ultraviolet radiation bombards the surface of the plastic with photons which excite the molecules and causes chemical and electronic changes in the surface molecules. It has been found that ultraviolet radiation at a wavelength of from 2000 to 3500 A. for 100 watt seconds per square foot and preferably from about 1000 to about 6000 watt seconds per square foot induces a change in the surface such that a structurally strong bond to the surface may be formed by an elastomer-aldehyde resin adhesive. It is also found that a deposit of a photosensitizer such as a ketone, acenaphthene, certain chlorinated or brominated hydrocarbons increases the effectiveness of the ultraviolet radiation so that shorter radiation periods may be used. Useful ketones include benzophenone, acetophenone, benzoin 2-acetonaphthone, and so on. Useful chlorinated or brominated hydrocarbons include trimethylene bromide, bromoform, bromobenzene, trichloroethylene, perchloroethylene, hexachlorocyclopentadiene, chloroform and carbon tetrachloride. These photosensitizers are photoreductors and are effective under the action of radiation to take a hydrogen from a carbon atom in a chain without chain scission. It is believed that the radiation causes formation of a hydroperoxide and also an unsaturation at the surface of the polymeric material, and that the hydroperoxide passes to a hydroxide. It also appears that at least some of the photosensitizers such as benzophenone and acetophenone may become engrafted into the surface under the action of ultraviolet radiation to provide a surface having active groups.

The compositions effective to bond such radiated surfaces in the process of the present invention will comprise a reactive aldehyde-type resin and an elastomer. These materials are ordinarily applied to the surface in solution in a volatile organic solvent, but they may also be applied in other ways, for example, in the form of a thin film of the mixture. The preferred aldehyde-type resins are formed by condensation of alkyl or aryl substituted phenols with aldehydes under alkaline conditions and with an excess of aldehyde over the stoichiometric amount required for reaction with the phenol. In general, there may be combined from slightly more than 1 mol to as high as 2 mols of aldehyde to 1 mol of the substituted phenol. Formaldehyde is the customary aldehyde used in forming this resin but other aldehydes may be used. The phenol may be a lower alkyl substituted phenol such as paratertiary butyl phenol or paratertiary amyl phenol, or an aryl substituted phenol, for example, paraphenyl phenol.

The phenol formaldehyde resin condensate is preferably then reacted with a metal oxide such as magnesium oxide or lead oxide. This reaction may be carried out in organic solvent solution by addition to the solution of an excess of the metal oxide over the amount which will combine with the resin, the excess being preferably physically removed as by filtering or decantation thereafter. The reaction product of the metal oxide and the resin retains its solubility in volatile organic solvents but has become substantially infusible, i.e. it does not melt even when heated to temperatures sufficient to initiate decomposition.

The elastomer component of the adhesive may be a natural or synthetic material. For example, natural rubber, polychloroprene, butadiene acrylonitrile copolymer rubbers and butadiene styrene copolymer rubbers may be used. The elastomer material and the reacted resin material are combined in amount such that there is at least about 5 percent of resin by weight based on the weight of the elastomer and the amount of the resin may be 100 percent or more by weight based on the weight of the elastomer.

While the formation of the reactive resin component and its combination with metal oxide has been described as being carried out separately from the association of the resin with the elastomer, substantially equivalent results are obtainable where the phenol aldehyde condensation product is combined with the elastomer before reaction with the metal oxide.

The adhesive is ordinarily applied to the surface such as polyethylene to be bonded in the form of a volatile organic solvent solution. A variety of organic solvents may be used. It is preferred to use solvent mixtures including at least about 5 percent and preferably not over about 15 percent by volume of aromatic organic solvent liquids. But these limits are not hard and fast. Along with the aromatic solvent there may be used conventional ester or ketone solvents such as ethyl acetate, methyl-ethyl ketone and the like. Also the aromatic and ketone solvents may be extended by using a hydrocarbon such as petroleum naphtha, cyclohexane or hexane. Solvent mixtures are readily compounded by the skilled chemist.

Bonding is effected by applying the adhesive composition to the radiated surface, allowing organic solvent to evaporate to bring the surface to tacky solid adhesive condition and assembling the adhesive coated surface against a further surface to which it is to be bonded. Bonding may be assisted by heat. Alternatively, the adhesive coated surface may be dried and reactivated by heat or by applying further solvent to the dried surface of the adhesive before pressing the adhesive against the surface to which it is to be bonded.

As noted above, the radiation causes formation of hydroperoxide, produces unsaturation at the surface of the substrate and, at least in some instances, involves engrafting of the photosensitizer into the molecules at the surface of the substrate to be bonded. It is believed that OH groups, either phenolic OH, or OH groups forming part of methylol groups of the resin may react with hydroxyl groups on the surface of the substrate or with groups on engrafted photosensitizer residue to create a chemical bond to the surface and also to strengthen the surface of the substrate. This strengthening through chemical reaction and strengthening through crosslinking which may be effected by the radiation are believed to eliminate elements forming a weak boundary at the surface of the substrate to enable formation of a structurally strong bond to the substrate. In addition, the development of unsaturation and of the hydroxide, hydroperoxide and other groups are believed to develop a surface character such that adhesive film is compatible with and physically cooperates with the surface of the substrate to give superior bonding action.

The above theory as to operation is advanced as of possible assistance in understanding the invention, but it is to be understood that the patentability of the adhesive process is not dependent on the correctness of the theory since a new and useful adhesive process is provided enabling the formation of strong bonds to difficulty bondable surfaces such as polyethylene.

The following examples are given to aid in the understanding the invention; but it is to be understood that the invention is not limited to the particular materials, procedures, proportions or other conditions employed in the examples.

EXAMPLE I

Strips of low density polyethylene 1 inch wide, 3½ inches long and 0.060 inch in thickness were dipped in trichloroethylene and were subjected to ultraviolet radiation by disposing surfaces of the strips at a distance of 3 inches from a 1500-watt ultraviolet lamp (major wavelength 2537 A.) for 15 seconds while trichloroethylene was still present on the polyethylene.

After radiation, the treated surfaces were given a coating of the following adhesive.

| Component | Parts by Weight |
|---|---|
| Neoprene | 100 |
| Stearic Acid | 1 |
| Magnesium Oxide | 8 |
| Pentaerythritol Ester of Rosin (Pentalyn K) | 55 |
| Acetic Acid (Glacial) | 1 |
| Alkali Catalyzed Condensation Resin From Paratertiary Butyl Phenol and Formaldehyde (Bakelite Resin CKR 5360) | 45 |
| Toluene | 25 |
| Textile Spirits | 300 |
| Methyl Ethyl Ketone | 200 |

The adhesive coating was dried for 1 ½ hours and the surfaces were then subjected to radiant heat activation at 170° F. for 30 seconds. Strips were assembled with the adhesive coated surface of one against the adhesive coated surface of the other to provide a 1-inch overlap and the assembly was pressed.

One day after completion of the bonds, the bonds were tested in shear. At a value of 191 lbs. per sq. inch, stock failure occurred and the joint remained intact.

Bonds between strips of polyethylene which had not been radiated but which had been coated with the same adhesive and assembled as in the foregoing test showed failure of the bond by separation of the adhesive from the polyethylene at the interface at a value of only 64 lbs. per sq. inch.

EXAMPLE II

A series of strips of polypropylene one inch wide, 3 ½ inches long, and 0.060 inch in thickness were dipped in trichloroethylene, radiated, coated with adhesive, activated and assembled as in example I.

At a value of 252 lbs. per sq. inch, the stock failed and the joint remained intact.

In a control test in which the polypropylene strips had not been dipped in trichloroethylene and radiated, the bond failed at 35 lbs. per sq. inch with interfacial failure, i.e. separation of the adhesive from the polypropylene at the interface.

EXAMPLE III

Using strips of polyethylene and of polypropylene and treatment prior to application of adhesive as listed in the following table, the bond strengths noted were obtained.

TABLE I

| Radiation at 3″ distance | Pretreatment | Bond strength pounds, | Type of failure |
|---|---|---|---|
| Polyethylene: | | | |
| 5 seconds | None | 72 | Interfacial. |
| 15 seconds | do | 81 | Do. |
| 5 seconds | Trichloroethylene dip | 131 | Cohesive. |
| Polypropylene: | | | |
| 5 seconds | None | 58 | Interfacial. |
| 15 seconds | do | 54 | Do. |
| 5 seconds | Trichloroethylene dip | 201 | Stock. |

EXAMPLE IV

The procedure of example I was repeated with the substitution of a 5 percent by weight solution of benzophenone in acetone for the trichloroethylene, that is, the strips of polyethylene were dipped in the benzophenone solution rather than in the trichloroethylene.

The bond strength with a ¾-inch by 1-inch overlap was 249 lbs. and failure of the bond was cohesive.

EXAMPLE V

The procedure of example IV was repeated using polypropylene strips rather than polyethylene and a bond strength of 192 lbs. per sq. inch was obtained. Failure of the joint was cohesive.

EXAMPLE VI

The surfaces to be bonded of polyethylene heel bases and rubber top lifts were brushed with a 30 percent by weight solution of benzophenone in acetone. The treated surfaces were given an ultraviolet radiation of 4500 watt seconds per sq. inch and a coating of the following adhesive was brushed on and allowed to dry for 1 ½ hours.

| Component | Parts by Weight |
|---|---|
| Neoprene | 100 |
| Alkali-Catalyzed Condensation Product of | |

| | | |
|---|---|---|
| p-tert butyl phenol and Formaldehyde (Sp 103) | | 30 |
| Magnesium Oxide | | 10 |
| Stearic Acid | | 0.5 |
| Zinc Oxide | | 5 |
| Mineral Reinforcing Agents | | 5 |
| Chlorinated Rubber | | 30 |
| Solvent Mixture, toluol, textile spirits and mineral spirits | Toluene | 135 |
| | Textile Spirits | 80 |
| | MEK | 190 |

The adhesive coated surfaces were activated at 160° F. for 30 seconds, assembled and pressed together. When tested after 3 days, good bonds were obtained.

EXAMPLE VII

The surfaces to be bonded of polyethylene heel bases and rubber top lifts were brushed with a 30 percent by weight solution of benzophenone in acetone. The treated surfaces were given an ultraviolet radiation of 4500 watt seconds per square inch and a coating of the following adhesive was brushed on and allowed to dry for 1 ½ hours.

| Component | Parts by Weight |
|---|---|
| Butadiene Acrylonitrile Copolymer | 100 |
| Alkali-Catalyzed Condensation Product of p-tert butyl Phenol and Formaldehyde (Durez 175) | 109.4 |
| Acetone | Sufficient to give 34% by weight solids content solution |

The adhesive coated surfaces were activated at 175° F. for 30 seconds, assembled and pressed together. When tested after 3 days, good bonds were obtained.

Having thus described my invention what I claim as new and desire to secure by Letters Patent of the United States is:

I claim:

1. The process for bonding a surface of a polymer resin body having at least some hydrogen on a carbon chain in a repeating unit in the polymer chain and having a critical surface tension of wetting of less than about 35 dynes per centimeter comprising the steps of generating groups which interact with a deposited adhesive by radiating said surface with ultraviolet radiation having a wavelength of from 2000 to 3500 A. providing from 100 watt seconds to 6000 watt seconds per square foot, depositing on said radiated surface an adhesive comprising an intimate mixture of a heat-hardening resinous condensation product of formaldehyde and a parahydrocarbon-substituted phenol and at least one compatible rubber elastomer from the group consisting of polychloroprene, butadiene-acrylonitrile copolymer rubber, butadiene—styrene copolymer rubbers and natural rubbers, said mixture containing at least 5 percent by weight of said condensation product based on the weight of said elastomer pressing said body with said adhesive in activated condition against a surface to which the body is to be joined and hardening said adhesive.

2. The process for bonding a surface of a polymer resin body as defined in claim 1 in which a photosensitizer is present at the surface of said body at the time of radiation.

3. The process for bonding a surface of a polymer resin body as defined in claim 2 in which said compatible rubber is polychloroprene, and in which said resinous condensation product is present in said adhesive as the salt of a metal from the group consisting of magnesium and lead.

4. The process for bonding a surface of a polymer resin body as defined in claim 3 in which said polymer resin is selected from the group consisting of polymers of ethylene and polymers of propylene, and said radiation is continued for a time to provide from about 1000 to about 6000 watt seconds per square foot.

5. The process for bonding a surface of a polymer resin body as defined in claim 4 in which said adhesive is deposited as a coating of a solution in a volatile organic solvent, said solvent is evaporated and thereafter the adhesive is activated before bringing said body against a surface to which the body is to be joined.

6. The process for bonding a surface of a polymer resin body as defined in claim 5 in which said adhesive is activated by heat.

7. The process for bonding a surface of a polymer resin body as defined in claim 5 in which said adhesive is activated by applying a solvent to the deposited adhesive.

8. The process for bonding a surface of a polymer resin body as defined in claim 4 in which said photosensitizer comprises at least one member selected from the group consisting of benzophenone, acenaphthene, trichloroethylene, acetophenone, benzoin and 2-aceto-naphthone.

9. The process for bonding a surface of a polymer resin body as defined in claim 8 in which said photosensitizer comprises benzophenone.

* * * * *